United States Patent [19]
Morishita et al.

[11] Patent Number: 4,904,062
[45] Date of Patent: Feb. 27, 1990

[54] COLLIMATING LENS FOR USE IN OPTICAL MEMORIES

[75] Inventors: Ichiro Morishita, Iwanuma; Hiroko Hanzawa, Shiroishi, both of Japan

[73] Assignee: Alps Electric Co. Ltd., Tokyo, Japan

[21] Appl. No.: 321,484

[22] Filed: Mar. 8, 1989

[30] Foreign Application Priority Data

May 20, 1988 [JP] Japan .................................. 63-123706

[51] Int. Cl.$^4$ .............................................. G02B 3/02
[52] U.S. Cl. .................................................... 350/432
[58] Field of Search ...................... 350/432, 96.12, 433, 350/434, 435

[56] References Cited
U.S. PATENT DOCUMENTS 4,431,267 2/1984 Finck et al. .
4,820,029 4/1989 Iwai et al. ........................... 350/432
4,842,388 6/1989 Tanaka et al. ...................... 350/432

FOREIGN PATENT DOCUMENTS 61-147212 4/1986 Japan .

Primary Examiner—P. M. Dzierzynski
Attorney, Agent, or Firm—Guy W. Shoup; Stephen L. Malaska

[57] ABSTRACT

An improved collimating lens for use in optical memories is disclosed which comprises a first surface for receiving the incident beam which is concave, and a second surface for emitting the outgoing beam which is convex and non-spherical, characterized in that the said lens satisifies some particular conditions. If the collimating lens of the present invention is used, the beam passing through the periphery of the lens can be concentrated, and therefore, the actual number of openings of the objective lens is increased, and at the same time, the coupling efficiency can be improved. Accordingly it is possible to form very tiny spot on the disc, and the transmission rate can also be improved. Further, the appearance of the lens can be favorably shaped when manufacturing the lens, because the lens of the present invention is strong against the difference of the axes.

1 Claim, 4 Drawing Sheets

COLLIMATING LENS FOR USE IN OPTICAL MEMORIES

FIELD OF THE INVENTION

The present invention relates to a collimating lens for use in optical memories, in which the number of the actual openings of the objective lens can be increased, and the spot diameter can be reduced as far as possible.

BACKGROUND OF THE INVENTION

Generally a collimating lens for obtaining a parallel beam of rays from a diverging beam of rays is designed such that it can meet the sine condition. For example, in the case of a thin lens, if the radius of curvature $r_1$ of the first surface and the radius of curvature $r_2$ of the second surface satisfy the following formulas, the lens satisfies the sine condition, and becomes a collimating lens without a coma aberration.

$$1/r_1 = \{(n^2-n-1)/(n^2-1)\}(1/f)$$

$$1/r_2 = \{n^2/(n^2-1)\}(1/f)$$

where f represents the focal distance, and n the refractive index. The usual collimating lenses adopt a radius satisfying the above formules or a similar radius. If the material of the lens is glass, as the usual refractive index of glass is $n = 1.5 \sim 1.9$, the radius becomes $-35 > r_2$ or $r_2 > 25$.

In the far field pattern of the beam emitting from a semiconductor laser, the horizontal mode gives a smaller beam distribution width than the vertical mode, and therefore, the lateral mode $\theta''$ becomes smaller than the longitudinal mode $\theta_1$. If, in this way, the beam spot is formed on the records of the optical disc, the spot diameter in the direction of the lateral mode $\theta''$ becomes longer, thereby forming an ellipse. Therefore, as shown in FIG. 5, an anamorphic prism 3 is disposed at the front of the semiconductor laser 1 and the collimating lens 2 in order to modify such that a substantially circular pattern of parallel beam should be formed. As shown in FIG. 5, in a pickup for use in an optical memory having an anamorphic prism 3, the necessary condition is that an intensive beam is concentrated onto the recorded surface of an optical disc to form a small spot as far as possible. Then the condition for a collimating lens accompanied to the above fact is how to efficiently derive the beam of rays from a semiconductor laser, that is, how to improve the coupling efficiency and how to increase the actual number NAob of opening of the objective lens.

If the focal distance $f_t$ of the objective lens facing the optical disc is assumed to be 4.0 mm, and its effective diameter to be 4.4 mm, then the number of the openings will be NAob=0.55. If the number of the openings of the collimating lens is needed by more than 0.3, then the effective diameter of the collimating lens can be made to be 4.4 mm, and the focal distance $f_{cor}$ to be 7 mm to obtain the number of openings NAcor of 0.3143.

If the semiconductor laser LT024 manufactured by Sharp Corporation is used, the radiation characteristics of the laser becomes as follows:

$$8 \leq \theta'' \leq 14$$

$$20 \leq \theta_1 \leq 38 \quad\quad\quad (A)$$

Here, if the beam shaping ratio m for $\theta$ due to the anamorphic prism is determined to be 2.7 times, the following relation is obtained.

$$21.6 \leq m\theta'' \leq 37.8,$$

that is, $\theta'' \approx \theta$

In light of the above prerequisites, now the coupling efficiency and the actual number of openings of the objective lens will be considered. First, regarding the coupling efficiency, the higher the coupling efficiency is in an optical memory unit, the greater the concentration of the laser beam becomes, thereby speeding up the recording of information. But depending on the said conditions of the beam shaping ratio, the coupling efficiency can be dropped to about 48% which is below the usually required value. If the coupling efficiency is increased possibly up to 100%, a speedy transmission rate can be obtained.

If the above mentioned ordinary collimating lens is used, dispersing of the beam spot reaching the optical disc occurs due to the diverging trend in the radiation characteristics of semiconductor laser, and therefore, there are cases in which the actual number of openings of the objective lens can not be made to be 0.55. If the usual collimating lens (number of opening NAcor=0.3143) and the usual objective lens (number of openings NAob=0.55) are used, and if a semiconductor laser having a radiation characteristics shown by the formula (A) above and an anamorphic prism having the above mentioned beam shaping ratio (m=2.7 times) are used, then the diameter of the beam spot reaching the recording surface of the disc is calculated as shown by the graphs of FIG. 6. In this drawing, the Tan direction indicates the width of the spot in the direction tangential to the track, while the Rad direction indicates the width of the spot in the radial direction of the disc. In this drawing, reference code (a) represents the width of the spot in the tangential direction when $\theta_1$ diverges up to 20 to 38 degree, and when $\theta''$ is at the minimum angle of 8 degrees. Reference code (b) represents the width of the spot in the tangential direction when $\theta_1$ diverges up to 20 to 38 degree and when $\theta''$ is at the maximum angle of 14 degrees. Reference code (c) represents the width of the spot in the radial direction when $\theta_1$ diverges up to 20 to 38 degrees and when $\theta''$ is at the minimum angle of 8 degrees. Reference code (d) represents the width of the spot in the radial direction when $\theta_1$ diverges up to 20 to 38 degrees and when $\theta''$ is in the maximum angle of 14 degrees. In these graphs, the spot diameter is dispersed to 1.15 μm to 1.32 μm, while the ratio of the lateral dimension to the longitudinal dimension becomes 0.9 to 1.15. Based on this fact, the actual number of openings of the objective lens can be calculated using the following formula:

$$NAob = 0.82 \times \lambda/\text{spot diameter}$$

(where $\lambda$ is the wave length of the beam). NAob=0.49~0.55 is obtained by substituting the spot diameter 1.15 to 1.32 μm. That is, it is possible that the actual number of openings of the objective lens can be smaller than 0.55 which is the designed value. Therefore, the diameter of the spot of the laser beam formed on the recording surface of the disc is expanded, resulting in that the concentration is lowered, the transmission rate is decreased, and the recording density is lowered.

SUMMARY OF THE INVENTION

The present invention is intended to overcome the disadvantages mentioned above. Therefore it is the object of the present invention to provide a collimating lens for use in optical memories, in which the coupling efficiency is improved, the reduction of the actual number of openings due to the diverging of the laser beam is prevented, and the formation of very tiny spot on the recording surface of the disc is realized, thereby obtaining a speedy transmission rate.

BRIEF DESCRIPTION OF THE DRAWINGS

The above object and other advantages of the present invention will become more apparent by describing the preferred embodiments of the present invention with reference to the attached drawings in which.

DESCRIPTION OF THE PREFERRED EMBODIMENTS

Figure 1:
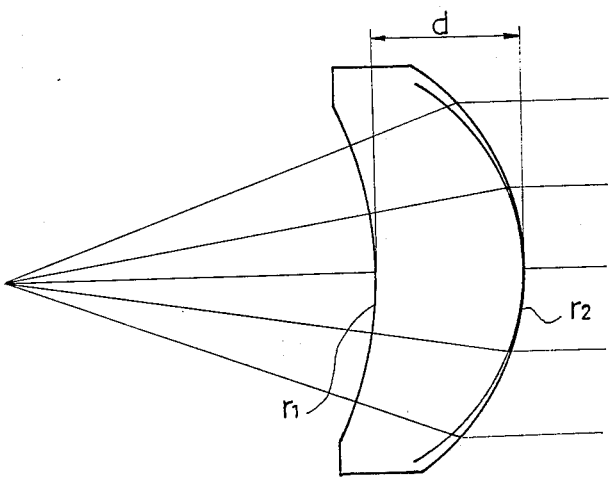
FIG. 1 is a side view of the collimating lens for use in optical memories according to the present invention.
Figure 2:
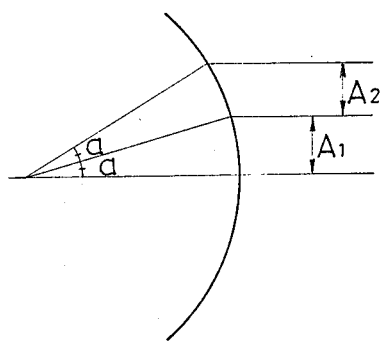
FIG. 2 is a diagrammatic view showing the refraction of the beam passing through the main surface of the conventional collimating lens.

As shown in FIG. 1, the collimating lens of the present invention for use in an optical memory is constituted such that its first surface receiving the incident sensing beam is concave, and the second surface for emitting the outgoing beam is convex and is non-spherical. The collimating lens of the present invention thus constituted should satisfy the following conditions.

(1) $-1 < r_1 - f + d < 5$ where $r_1$ is the radius of curvature of the first surface, f the focal distance, d the thickness of the lens at its centre.

(2) The second surface of the non-spherical shape will satisfy the following formula on the meridian plane of the certesian coordinate having the peak of the non-spherical surface as the origin of the coordinate, assuming that the beam axis is X axis and the radial direction of the lens is Y axis.

$$X = (y^2/r_2)/\{1 + \sqrt{1 - (1+k)(y^2/r_2^2)}\}$$

where $r_2$ is the radius of curvature of a sphere outfitting to the second surface, and k is the conic constant.

(3) The said conic constant should satisfy the following condition:

$$-0.005 < k + (1/n)^2 < 0.015$$

where n is the refractive index of the material of the lens.

In the constitution described above, the first surface can be made to be spherical, and $r_1$ can be made to be approximately equal to $(f+d)$, thereby making the first surface have a constitution with no power. Therefore, the beam passes through the first surface almost without making any refraction. Further, under the condition (1), if $(r_1 - f + d)$ becomes smaller than $-1$, the performance is extremely degraded in the case where a difference is generated between the axes of the first and second surfaces. If the said value is made to be larger than 5, that is, if $r_1$ is increased, the effect of increasing the actual number of openings NA of the objective lens is decreased.

Figure 3:
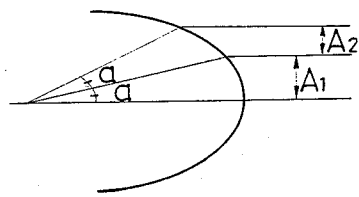
FIG. 3 is a diagrammatic view showing the refraction of the beam through the main surface of the collimating lens according to the present invention.
Figure 4:
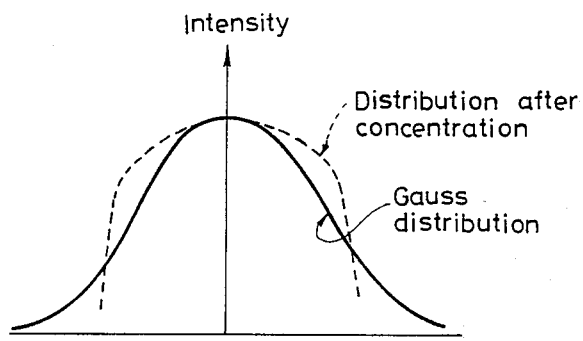
FIG. 4 is a graph showing the state of concentration of the beam passing through the collimating lens of the present invention.
Figure 5:
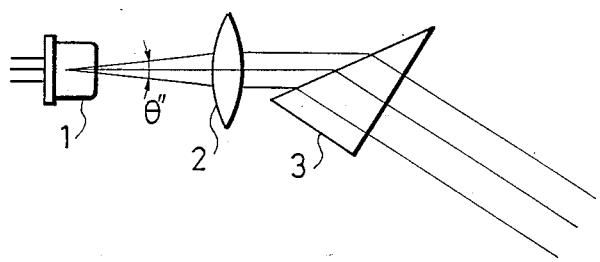
FIG. 5 is an arrangement of a part of optical components for an optical memory.

Further, if the second surface is made to be non-spherical, and if k is made to be approximately equal to $(1/n)^2$ under the condition (3) above, the non-spherical second surface becomes an ellipse, as well as the main surface of the second main point at the beam outgoing side takes a shape similar to a revolving ellipse. In other words, under the condition (3) above, the main surface of the second main point comes to have a shape similar to an ellipse, and this main surface can be disposed near the second surface. Thus if the main surface of the second main point is made to be a surface of a quadratic function, and particularly if it is made to be an ellipse or to be similar to an ellipse, then the height $A_1$, $A_2$ of the collimated beam for each angle unit becomes smaller as the periphery is approached (that is, $A_1$ $A_2$, refer to FIG. 3). Further compared with the case where the main surface is spherical, the beam passing through the periphery can be concentrated much more. Therefore, as shown in FIG. 4, if the collimating lens of the present invention is used, the beam intensity distribution is further concentrated compared with the conventional gauss distribution, as shown by the dotted lines. Therefore, particularly in a semiconductor laser, the radiation characteristics $\theta_1$ can be improved such that the diverging of the beam can be reduced, at the same time, inhibiting the expanding of the diameter of the beam spot, and preventing the reduction of the actual number of openings of the objective lens. Further, because the beam can be concentrated to make it converged, the coupling efficiency can be improved. Therefore, even if the beam shaping ratio is determined at a high level in order to expand the beam diameter in the direction of $\theta_{"}$, the spreading of $\theta_{"}$ becomes very small, thereby inhibiting the reduction of the coupling efficiency.

In this context, the problem of coma aberration for failing to satisfy the sine condition has to be considered. Therefore, there arises the need for adjusting the collimating lens by inclining $\theta_1$ by about $\pm 1°$. But in the case where the beam is formed by means of an anamorphic prism, an inclining adjustment in the $\theta_{"}$ direction is not needed, because the central portion of the collimated beam is used.

EXPERIMENTS

Now the present invention will be described based on different experiments. In the experiments as shown in Table 1, the focal distance f of the collimating lens was 7 mm, its central thickness d 2 mm, its effective diameter 4.4 mm, and the refractive index n 1.65.

TABLE 1

| Experiments | $r_1$ | $r_2$ | k | NA |
|---|---|---|---|---|
| A | 4 | 2.54794 | −0.36820 | 0.35207 |
| B | 5 | 2.75758 | −0.367309 | 0.34375 |
| C | 6 | 2.92747 | −0.368152 | 0.33847 |
| D | 7 | 3.06795 | −0.370452 | 0.33480 |
| E | 8 | 3.18604 | −0.373838 | 0.33212 |
| F | 9 | 3.28670 | −0.377978 | 0.33006 |
| G | 10 | 3.37353 | −0.382610 | 0.32844 |

In the experiments of Table 2 below, the conditions were same as those of Table 1 except that the refractive index was varied to n=1.897.

TABLE 2

| Experiments | $r_1$ | $r_2$ | k | NA |
|---|---|---|---|---|
| H | 4 | 2.66955 | −0.282145 | 0.34121 |
| I | 5 | 3.30929 | −0.277987 | 0.33447 |
| J | 6 | 3.55099 | −0.279187 | 0.33009 |
| K | 7 | 3.75628 | −0.282601 | 0.32701 |
| L | 8 | 3.93282 | −0.287834 | 0.32472 |
| M | 9 | 4.08624 | −0.294466 | 0.32296 |
| N | 10 | 4.22081 | −0.302123 | 0.32156 |

Of the above experiments, B and I are satisfying the condition of $r_1=(f-d)$, the curving of their first surfaces were almost eliminated, and their aberrations were corrected. But, as in the other experiments, even if the radius of curvature for the first surface was varied under the condition of $r_1=(f-d)$, the correction of aberration should be possible. Table 3 below shows the wave aberration when the difference between the axes of the first and second surfaces is made to be 50μm.

Usually in a collimating lens in which NA is 0.3 0.35, the difference between the axes of the first and second surfaces has to be kept below 10 μm. But as shown in Table 3, the results of the experiments are acceptable even with a 50 μm of difference between the axes of the first and second surfaces. Therefore, the lens of the present invention is very strong against the difference of the axes.

TABLE 3

| Experiments | Wave aberration without difference between the axes | Wave aberration with difference between the axes |
|---|---|---|
| A | 0.000 | 0.027 |
| B | 0.000 | 0.008 |
| C | 0.000 | 0.015 |
| D | 0.001 | 0.022 |
| E | 0.001 | 0.026 |
| F | 0.001 | 0.028 |
| G | 0.002 | 0.030 |
| H | 0.000 | 0.035 |
| I | 0.000 | 0.012 |
| J | 0.000 | 0.019 |
| K | 0.000 | 0.028 |
| L | 0.001 | 0.033 |
| M | 0.001 | 0.035 |
| N | 0.001 | 0.037 |

Figure 7:
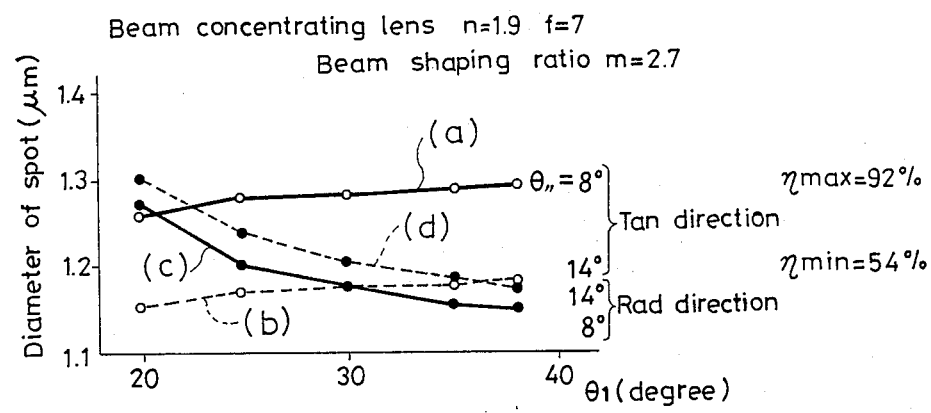
FIGS. 7 to 9 are graphical illustrations of the relationship between the radiation characteristics of a semiconductor laser and the diameter of the spot formed on the disc when the collimating lens according to the present invention is used.
Figure 8:
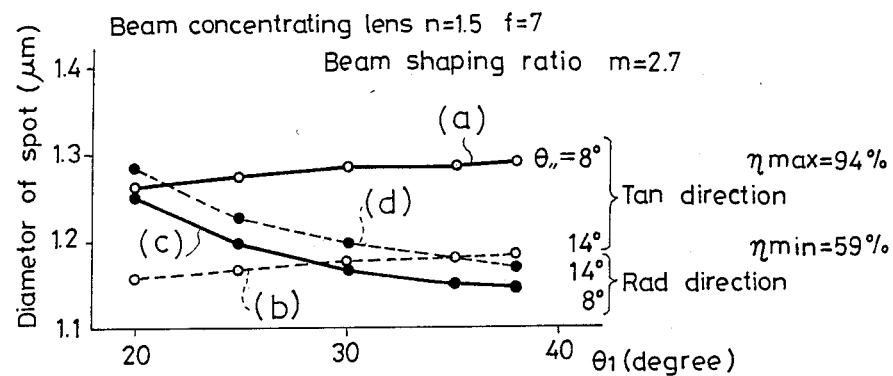
Figure 9:
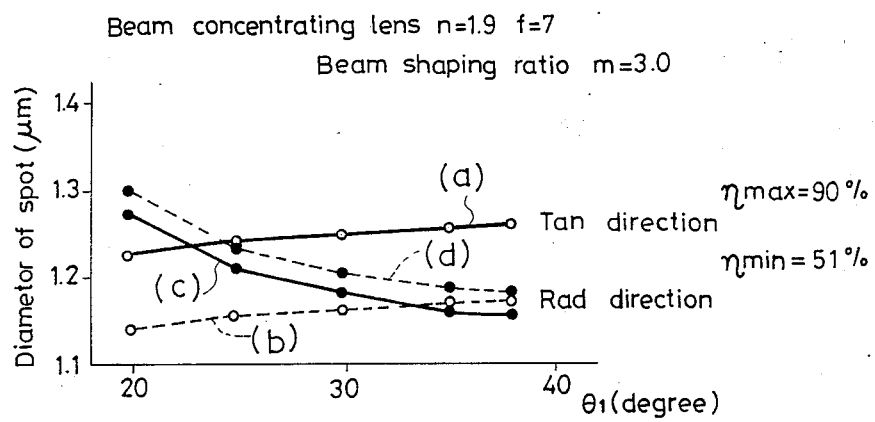

FIGS. 7 to 9 show the diameters of the spots formed on the disc. At the right side of these graphs, there are indicated the maximum and minimum values of the coupling efficiency. These graphs show the results of calculations made by varying the refractive index n and the beam shaping ratio m for the anamorphic prism, under the conditions that $r_1=5$ mm, d=2 mm, f=7 mm, a collimating lens with the effective diameter of 4.4 is used, an objective lens with the effective diameter of 4.4 mm and with the number of openings of 0.55 mm and with the focal distance of 4 mm is used, and the divergence characteristics is as follows:

$$8 \leq \theta'' \leq 14$$

$$29 \leq \theta_1 \leq 38$$

Figure 6:
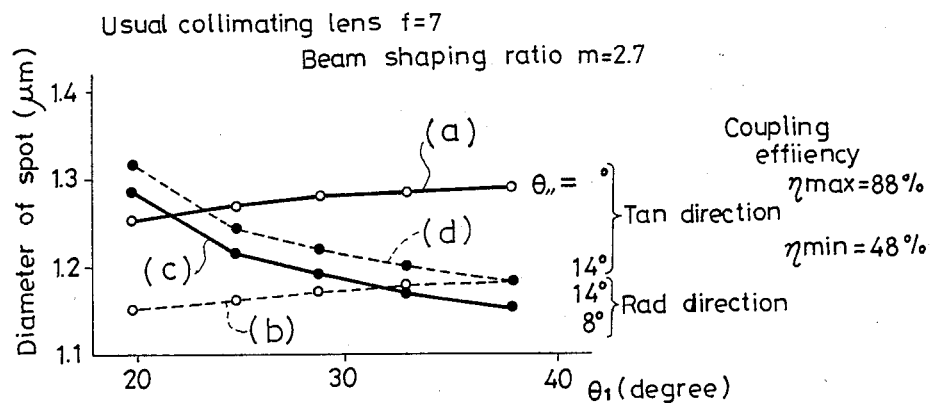
FIG. 6 is a graphic illustration of the relationship between the radiation characteristics of a semiconductor laser and the diameter of the spot formed on the disc when a conventional collimating lens is used.

In each of these graphs, Tan direction shows the width of the spot in the direction of the track, while Rad direction shows the width of the spot in the radial direction. Also in these graphs, the curve (a) shows the width of the spot in the Tan direction, when $\theta''$ is at the minimum angle of 8 degrees, and $\theta_1$ is diverged to about 20 to 38 degrees. The curve (b) shows the width of the spot in Tan direction, when $\theta''$ is at the maximum angle of 14 degrees and $\theta_1$ is diverged to about 20 to 38 degrees. The curve (c) shows the width of the spot in Rad direction when $\theta''$ is at the minimum angle of 8 degrees and $\theta_1$ is diverged to about 20 to 38 degrees. The curve (d) shows the width of the spot in Rad direction when $\theta''$ is at the maximum angle of 14 degrees and $\theta_1$ is diverged to about 20 to 38 degrees. In each of the said graphs, it can be recognized that the spreading of the diameter of the spot is very small and the actual number of openings of the objective lens is increased, compared with the case where the conventional collimating lens is used as in FIG. 6. Further, the coupling efficiency is also improved compared with the case of FIG. 6.

As described above, if the collimating lens of the present invention is used, the beam passing through the periphery of the lens can be concentrated, and therefore, the actual number of openings of the objective lens can be increased, and at the same time, the coupling efficiency can be improved. Accordingly, it is possible to form very tiny spot on the disc, and the transmission rate can also be improved. Further, the appearance of the lens can be favorably shaped when manufacturing the lens, because the lens of the present invention is strong against the difference of the axes.

What is claimed is:

1. A collimating lens for use in optical memories, comprising : a first surface for receiving the incident beam which is concave, and a second surface for emitting the outgoing beam which is convex and non-spherical, characterized in that the said collimating lens satisfies the following conditions:

(1) $-1 < r_1 - f + d < 5$ where $r_1$ is the radius of curvature of the first surface, f the focal distance, and d the thickness of the lens at its centre;

(2) In the meridian plane of the cartesian coordinate where it is assumed that the optical axis of the non-spherical shape of the second surface is the X axis, the radial direction of the lens the Y axis, and the peak of the non-spherical surface the origin of the coordinate.

$$X = (y^2/r_2)/\{1 + \sqrt{1-(1+k)(y^2/r_2^2)}\}$$

where $r_2$ is the radius of curvature of the second surface, and k the conic constant;

(3) The said conic constant should satisfy the following condition, $$-0.005 < k + (1/n)^2 < 0.015$$

where n is the refractive index of the material of the lens.

* * * * *